US009523960B2

(12) United States Patent
Hanzawa et al.

(10) Patent No.: US 9,523,960 B2
(45) Date of Patent: Dec. 20, 2016

(54) ILLUMINATION DEVICE, DISPLAY APPARATUS, AND TIMEPIECE

(71) Applicant: CASIO COMPUTER CO., LTD., Tokyo (JP)

(72) Inventors: Kei Hanzawa, Akishima (JP); Eiji Yamakawa, Tama (JP)

(73) Assignee: CASIO COMPUTER CO., LTD. (JP)

( * ) Notice: Subject to any disclaimer, the term of this patent is extended or adjusted under 35 U.S.C. 154(b) by 179 days.

(21) Appl. No.: 14/323,150

(22) Filed: Jul. 3, 2014

(65) Prior Publication Data

US 2015/0009783 A1 Jan. 8, 2015

(30) Foreign Application Priority Data

Jul. 8, 2013 (JP) .................. 2013-142980

(51) Int. Cl.
*G01K 1/06* (2006.01)
*G04B 19/30* (2006.01)
*G04B 19/32* (2006.01)
*F21V 8/00* (2006.01)

(52) U.S. Cl.
CPC ............ *G04B 19/30* (2013.01); *G02B 6/0055* (2013.01); *G02B 6/0061* (2013.01); *G04B 19/32* (2013.01); *G02B 6/0018* (2013.01); *G02B 6/0036* (2013.01); *G02B 6/0068* (2013.01)

(58) Field of Classification Search
CPC ....... G04B 19/30; G04B 19/32; G02B 6/0055; G02B 6/0018; G02B 6/0036; G02B 6/0061; G02B 6/0068
USPC .................................... 362/23.01
See application file for complete search history.

(56) References Cited

U.S. PATENT DOCUMENTS

| 5,667,289 A * | 9/1997 | Akahane ............. G02B 6/0036 349/70 |
| 5,921,651 A | 7/1999 | Ishikawa |
| 5,931,555 A * | 8/1999 | Akahane ............. G02B 6/0036 349/64 |
| 7,525,531 B2 * | 4/2009 | Ogiwara ............. G02B 6/0036 345/102 |

FOREIGN PATENT DOCUMENTS

| JP | H08-271893 A | 10/1996 |
| JP | 2000-352947 A | 12/2000 |
| JP | 2003-279977 A | 10/2003 |
| JP | 2010-145477 A | 7/2010 |
| WO | 2012/053262 A1 | 4/2012 |

OTHER PUBLICATIONS

Japanese Office Action dated Feb. 10, 2015 for JP 2013-142980 and English translation of the same (7 pages).

* cited by examiner

*Primary Examiner* — Anh Mai
*Assistant Examiner* — Hana Featherly
(74) *Attorney, Agent, or Firm* — Fitch Even Tabin & Flannery LLP

(57) ABSTRACT

There is provided an illumination device including: a light guide plate in which a light diffusion pattern of diffusing incident light is formed to have density that is coarse on one side and gets denser toward the other side; a first light source which is provided on a side corresponding to the one side of the light diffusion pattern in the light guide plate; and a second light source which is provided on a side corresponding to the other side of the light diffusion pattern in the light guide plate.

19 Claims, 7 Drawing Sheets

ILLUMINATION DEVICE, DISPLAY APPARATUS, AND TIMEPIECE

CROSS-REFERENCE TO RELATED APPLICATION

This application is based on and claims priority under 35 U.S.C. §119 from Japanese Patent Application No. 2013-142980 filed on Jul. 8, 2013, the entire content of which is hereby incorporated herein by reference in its entirety.

FIELD OF THE INVENTION

The present invention relates to an illumination device, a display apparatus, and a timepiece including the device and apparatus where the illumination device is used in electronics such as a timepiece and a mobile phone.

BACKGROUND OF THE INVENTION

There is known a luminous display apparatus as disclosed in JP 2010-145477 A, for example, where a plurality of light sources having different emission wavelengths is disposed on one side of a light guide plate so that a plurality of display units provided on the light guide plate emits light in different luminescent colors by causing the plurality of light sources to separately radiate light for every different emission wavelength.

However, such illumination device has been unable to provide favorable and sufficient illumination effect because light emitted from a surface of the light guide plate has uniform luminance which cannot be increased in part to enhance brightness.

Provided in the present invention is an illumination device, a display apparatus, and a timepiece including these device and apparatus where the illumination device can emit light with uniform luminance and at the same time enhance brightness by partially increasing the luminance to be able to selectively express the emission of light in a different manner.

SUMMARY OF THE INVENTION

The present invention provides an illumination device including: a light guide plate in which a light diffusion pattern of diffusing incident light is formed to have density that is coarse on one side and gets denser toward the other side; a first light source configured to be provided on a side corresponding to the one side of the light diffusion pattern in the light guide plate; and a second light source configured to be provided on a side corresponding to the other side of the light diffusion pattern in the light guide plate.

BRIEF DESCRIPTION OF THE DRAWINGS

FIG. 4A is an enlarged plan view of the light guide plate while FIG. 4B is an enlarged rear view of the light guide plate;

DETAILED DESCRIPTION OF THE PREFERRED EMBODIMENTS

First Embodiment

There will now be described the first embodiment, in which the present invention is applied to a timepiece, with reference to FIGS. 1 and 2.

Figure 1:
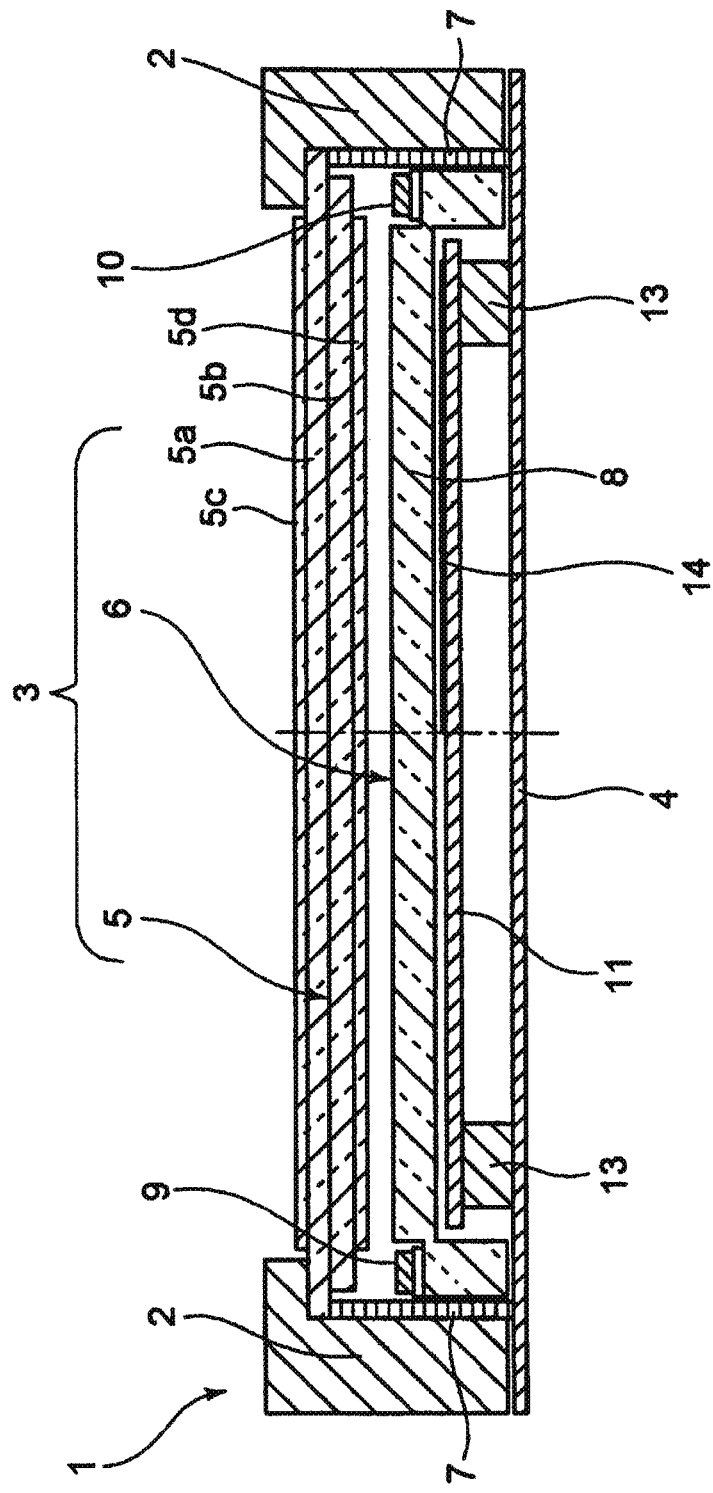
FIG. 1 is an enlarged cross-sectional view illustrating a principal part of a movement according to first embodiment in which the present invention is applied to a timepiece.

The timepiece includes a movement 1 as illustrated in FIG. 1. The movement 1 is configured to be fitted into a timepiece case (not shown). The movement 1 includes a frame-like housing 2 arranged in the timepiece case, a display apparatus 3 provided inside the housing 2, and a circuit board 4 which is disposed at the bottom of the housing 2 to electrically drive the display apparatus 3.

As illustrated in FIG. 1, the display apparatus 3 includes a transmissive liquid crystal display panel 5 and an illumination device 6 which illuminates a back surface side (a bottom surface side in FIG. 1) of the liquid crystal display panel 5. The liquid crystal display panel 5 includes a liquid crystal material (not shown) enclosed between a pair of upper and lower transparent electrode substrates 5a and 5b, an upper polarizing plate 5c provided on a top surface of the upper electrode substrate 5a, and a lower polarizing plate 5d provided on a bottom surface of the lower electrode substrate 5b.

The liquid crystal display panel 5 further includes a transparent electrode (not shown) that is arrayed into a matrix on a surface of each of the pair of transparent electrode substrates 5a and 5b facing each other. A pixel in the liquid crystal display panel 5 is constructed by these transparent electrodes vertically overlapping each another. Accordingly, voltage is selectively applied to the pixel arrayed into the matrix in the liquid crystal display panel 5 so that the arrangement of the liquid crystal material corresponding to the pixel is altered to be in a light-shielding state in which light is not transmitted. As a result, a piece of information can be displayed by the pixel in the light-shielding state.

Moreover, as illustrated in FIG. 1, the liquid crystal display panel 5 is supported in an upper part of the housing 2 by an inter-connector 7 that is disposed between an electrode terminal on each of both sides of the liquid display panel and a connection electrode on the circuit board 4. The liquid crystal display panel is electrically connected to the circuit board 4 in this state. As a result, the liquid crystal display panel 5 can electro-optically display information according to a drive signal input from the circuit board 4.

Figure 2:
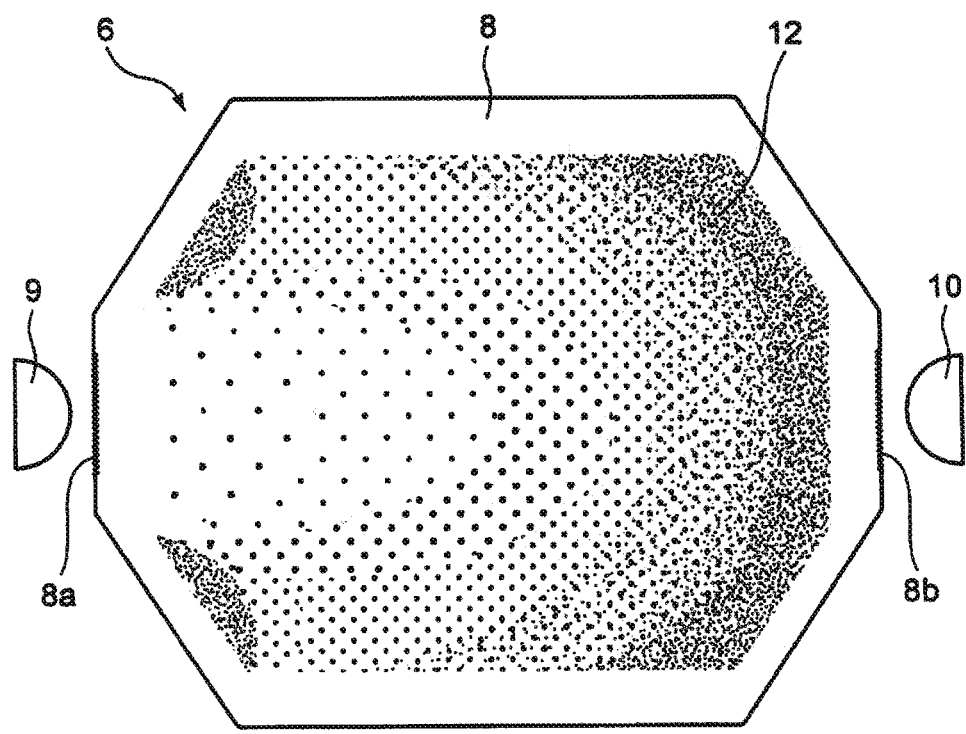
FIG. 2 is an enlarged plan view illustrating an illumination device of the movement illustrated in FIG. 1.

As illustrated in FIGS. 1 and 2, on the other hand, the illumination device 6 includes a light guide plate 8, a first light source 9 disposed on one side (a left side part in FIG. 1) of the light guide plate 8, a second light source 10 disposed on the other side (a right side part in FIG. 1) of the light guide plate 8, and a reflection plate 11 disposed on a bottom surface of the light guide plate 8.

The light guide plate 8 is formed of a transparent or semi-transparent light transmissive material and formed into a substantially square flat shape as illustrated in FIGS. 1 and 2. The light guide plate 8 forms a light diffusion pattern 12 of diffusing incident light to have density that is coarse on one side (a left side part in FIG. 2) and gets denser toward the other side (a right side part in FIG. 2). The light guide plate is further configured to emit the incident light from a top surface thereof.

In this case, as illustrated in FIG. 2, a first incident unit 8a which takes in light from the first light source 9 to the light guide plate 8 along a surface direction thereof is provided on the one side (the left side part in FIG. 2) of the light guide plate 8. Moreover, a second incident unit 8b which takes in light from the second light source 10 to the light guide plate 8 along the surface direction thereof is provided on the other side (the right side part in FIG. 2) of the light guide plate 8.

The first light source 9 is formed of a light-emitting diode (LED) emitting light in a visible spectral range such as white light, and is electrically connected to the circuit board 4 by a lead wire (not shown). The second light source 10 is formed of a light-emitting diode (LED) emitting light in an ultraviolet spectral range, and is electrically connected to the circuit board 4 by a lead wire (not shown) as is the case with the first light source 9.

The reflection plate 11 is configured to reflect light leaking from the bottom surface of the light guide plate 8 toward the light guide plate 8 as illustrated in FIG. 1, and is formed into a flat shape to correspond to the bottom surface of the light guide plate 8. The reflection plate 11 is disposed near or in close contact with the bottom surface of the light guide plate 8 while supported on the circuit board 4 by a support member 13.

A transparent fluorescent layer 14 is provided on a top surface of the reflection plate 11 as illustrated in FIG. 1. The transparent fluorescent layer 14 is formed of a transparent fluorescent ink which radiates light in the visible spectral range when an electron is excited by irradiation with light in the ultraviolet spectral range. The fluorescent layer 14 is provided in a region across roughly a right half of the reflection plate 11 corresponding to the side the second light source 10 is located. That is, the fluorescent layer 14 is provided in the region that is roughly half of the reflection plate 11 corresponding to the side where the density of the light diffusion pattern 12 in the light guide plate 8 is dense. Note that the fluorescent layer 14 is not limited to the one where the electron is excited by the irradiation with light in the ultraviolet spectral range, but may be one that radiates light in the visible spectral range once an electron is excited by absorbing energy generated by irradiation with an X ray or a visible ray.

In this case, the transparent fluorescent layer 14 is a multicolor printed layer which radiates light of a plurality of different wavelengths within the visible spectral range when the electron is excited by the irradiation with light in the ultraviolet spectral range. That is, the fluorescent layer 14 is printed with the fluorescent ink of a plurality of colors each radiating a visible ray of a different color (such as light of a wavelength corresponding to each of red, blue, and yellow) when the electron is excited by the irradiation with light in the ultraviolet spectral range. The transparent fluorescent layer 14 is thus configured to display a pattern or character in color when irradiated with light in the ultraviolet spectral range. Note that the fluorescent layer 14 is not limited to the multicolor printed layer but may be a monochrome printed layer.

The working of the display apparatus 3 in the timepiece will now be described.

In displaying information on the display apparatus 3, the first light source 9 of the illumination device 6 is turned on first to emit light in the visible spectral range. The emitted light in the visible spectral range is taken into the light guide plate 8 and is diffused by the light diffusion pattern 12. The diffused light in the visible spectral range is then emitted from the top surface of the light guide plate 8. The bottom surface of the liquid crystal display panel 5 is irradiated with the light in the visible spectral range being emitted. As a result, the liquid crystal display panel 5 is illuminated.

In other words, the light in the visible spectral range emitted from the first light source 9 by turning on the first light source 9 of the illumination device 6 is taken into the light guide plate 8 from the first incident unit 8a that is provided on one side of the light guide plate 8. The light in the visible spectral range being taken in travels roughly throughout the light guide plate 8 while being diffused roughly evenly from a coarse side toward a dense side of the light diffusion pattern 12.

A portion of the light in the visible spectral range travelling through the light guide plate 8 is emitted from the top surface of the light guide plate 8 and radiated onto the bottom surface of the liquid crystal display panel 5. Another portion of the light is emitted from the bottom surface of the light guide plate 8. A portion of the light being emitted is directly radiated on the top surface of the reflection plate 11, while another portion of the light transmits through the transparent fluorescent layer 14 provided on the reflection plate 11 and is radiated on the top surface of the reflection plate 11.

The light radiated on the top surface of the reflection plate 11 is reflected by the reflection plate 11 and is made incident on the light guide plate 8 once again. The light made incident on the light guide plate 8 is emitted from the top surface of the light guide plate 8 to be radiated on the bottom surface of the liquid crystal display panel 5. Accordingly, all the light in the visible spectral range emitted from the top surface of the light guide plate 8 is roughly evenly diffused by the light diffusion pattern 12 in the light guide plate 8 to be radiated on the bottom surface of the liquid crystal display panel 5 with roughly uniform luminance.

Once the liquid crystal display panel 5 is driven in this state, a plurality of pixels corresponding to display information among a number of pixels arrayed into a matrix on the liquid crystal display panel 5 shifts into the light-shielding state in which light is not transmitted. As a result, the light in the visible spectral range radiated on the bottom surface of the liquid crystal display panel 5 by the illumination device 6 transmits through the liquid crystal display panel 5 to be emitted thereabove excluding the region with the pixel in the light-shielding state.

The pixel in the light-shielding state is thus displayed as black-color information. At this time, the light in the visible spectral range is radiated on the bottom surface of the liquid crystal display panel 5 with roughly uniform luminance by the illumination device 6, whereby the black-color information displayed by the pixel in the light-shielding state on the liquid crystal display panel 5 is displayed well with a sharp contrast.

On the other hand, the light in the ultraviolet spectral range emitted from the second light source 10 by turning on the second light source 10 of the illumination device 6 in such state is taken into the light guide plate 8 from the second incident unit 8b provided on the other side of the light guide plate 8. The light in the ultraviolet spectral range being taken in travels while diffused from the dense side toward the coarse side of the light diffusion pattern 12, but does not reach the edge on the side where the density of the light diffusion pattern 12 is coarse.

Although a portion of the light in the ultraviolet spectral range travelling through the light guide plate 8 is emitted from the top surface of the light guide plate 8 and radiated on the bottom surface of the liquid crystal display panel 5, this type of light does not function as illumination light since the light in the ultraviolet spectral range is invisible. On the other hand, another portion of the light is emitted from the bottom surface of the light guide plate 8 so that the emitted light is radiated on the transparent fluorescent layer 14 that is provided on the reflection plate 11.

Being irradiated with the light in the ultraviolet spectral range, an electron in the transparent fluorescent layer 14 is excited to radiate light in the visible spectral range. A pattern or character is displayed in color in this case as the fluorescent layer 14 is the multicolor printed layer emitting the visible ray corresponding to different colors (such as light of a wavelength corresponding to each of red, blue, and yellow). A portion of the light in the visible spectral range emitted from the transparent fluorescent layer 14 is directly made incident on the light guide plate 8, while another portion of the light is reflected by the top surface of the reflection plate 11 and then made incident on the light guide plate 8. The light in the visible spectral range made incident on the light guide plate 8 in such manner is emitted from the top surface of the light guide plate 8 to be radiated on the bottom surface of the liquid crystal display panel 5.

At this time, the transparent fluorescent layer 14 is provided in a region covering roughly half the reflection plate 11 corresponding to the side the second light source 10 is located, namely, a region covering roughly half the reflection plate 11 corresponding to the side where the density of the light diffusion pattern 12 in the light guide plate 8 is dense. Therefore, when the electron in the transparent fluorescent layer 14 is excited by the irradiation with light in the ultraviolet spectral range to radiate light in the visible spectral range and display the pattern or character in color, the light in the visible spectral range in the color display is radiated in a region covering roughly half the liquid crystal display panel 5 corresponding to the side where the second light source 10 is located.

As a result, the light in the visible spectral range that is emitted from the top surface of the light guide plate 8 and used in the color display has higher luminance when radiated in the region covering roughly half the liquid crystal display panel 5 (the right half of the panel in FIG. 1) corresponding to the side the second light source 10 is located than when radiated in the region covering roughly half the liquid crystal display panel 5 (the left half of the panel in FIG. 1) corresponding to the side the first light source 9 is located.

Among the black-color information displayed by the pixel in the light-shielding state on the liquid crystal display panel 5, the black-color information displayed in the region covering roughly half the liquid crystal display panel 5 (the right half of the panel in FIG. 1) corresponding to the side the second light source 10 is located has enhanced brightness compared with the black-color information displayed in the region covering roughly half the liquid crystal display panel 5 (the left half of the panel in FIG. 1) corresponding to the side the first light source 9 is located. At the same time, the pattern or character is displayed in color as a background of the black-color information displayed on the liquid crystal display panel 5.

When the light is radiated by turning on only the second light source 10 without turning on the first light source 9, the light in the visible spectral range is not radiated in the region covering roughly half the liquid crystal display panel 5 (the left half of the panel in FIG. 1) corresponding to the side the first light source 9 is located. The light in the visible spectral range used to display the pattern or character in color is radiated only in the region covering roughly half the liquid crystal display panel 5 (the right half of the panel in FIG. 1) corresponding to the side the second light source 10 is located.

As a result, among the black-color information displayed by the pixel in the light-shielding state on the liquid crystal display panel 5, only the one displayed in the region covering roughly half the liquid crystal display panel 5 corresponding to the side the second light source 10 is located is displayed in the enhanced manner. At the same time, the pattern or character is sharply and well displayed in color as the background of the black-color information.

The illumination device 6 of the display apparatus 3 in the timepiece as described above includes: the light guide plate 8 which forms the light diffusion pattern 12 used to diffuse the incident light such that the density of the pattern is coarse on one side and gets denser toward the other side, and which emits the incident light from the top surface of the plate; the first light source 9 which is provided on the coarse side of the light diffusion pattern 12 in the light guide plate 8; and the second light source 10 which is provided on the dense side of the light diffusion pattern 12 in the light guide plate 8, whereby light can be emitted from the top surface of the light guide plate 8 with the roughly uniform luminance while at the same time the brightness can be partially enhanced by partially increasing the luminance of the light emitted from the top surface of the light guide plate 8. The emission of light can be expressed in a different manner as a result.

That is, in the illumination device 6 of the display apparatus 3, the light emitted from the first light source 9 upon turning on the first light source 9 is guided while being roughly evenly diffused across the light guide plate 8 by the light diffusion pattern 12 of the light guide plate 8. The illumination device 6 of the display apparatus 3 can therefore emit the guided light from the top surface of the light guide plate 8 with the roughly uniform luminance. Moreover, the illumination device 6 of the display apparatus 3 can partially enhance the brightness by partially increasing the luminance of the light emitted from the top surface of the light guide plate 8 by the dense part of the light diffusion pattern 12 in the light guide plate 8, when the light is emitted by turning on the second light source 10. As a result, the illumination device 6 of the display apparatus 3 can express the emission of light in a different manner by selectively emitting light from each of the first and second light sources 9 and 10.

In this case, the illumination device 6 emits light in the visible spectral range from the first light source 9 and light in the ultraviolet spectral range from the second light source 10. The light in the visible spectral range is emitted when the electron in the transparent fluorescent layer 14 is excited by the irradiation with light in the ultraviolet spectral range emitted from the second light source 10. Moreover, the transparent fluorescent layer 14 is provided to correspond to a part of the bottom surface of the light guide plate 8. The light in the visible spectral range emitted from the first light source 9 is roughly evenly diffused by the light diffusion pattern 12 in the light guide plate 8. As a result, the light in the visible spectral range emitted from the first light source 9 can be emitted from the top surface of the light guide plate 8 with the roughly uniform luminance while, at the same time, the light in the ultraviolet spectral range emitted from the second light source 10 can be converted into the light in the visible spectral range through the transparent fluorescent layer 14 and be emitted partially from the top surface of the light guide plate 8.

The light in the ultraviolet spectral range emitted from the second light source 10 is invisible. Once taken into the light guide plate 8, the light in the ultraviolet spectral range is emitted from the bottom surface of the light guide plate 8 and then radiated onto the transparent fluorescent layer 14 provided on the reflection plate 11. This causes the electron in the transparent fluorescent layer 14 to be excited to emit the light in the visible spectral range. The light in the visible spectral range can then be emitted partially from the top surface of the light guide plate 8.

The transparent fluorescent layer 14 in this case is the multicolor printed layer which emits light of the plurality of different wavelengths within the visible spectral range when the electron is excited by the irradiation with light in the ultraviolet spectral range. Moreover, the transparent fluorescent layer 14 is printed with the plurality of fluorescent inks of multiple colors, each of which emits a visible ray corresponding to a different color (such as the light of the wavelength corresponding to each of red, blue, and yellow). The pattern or character can thus be displayed in color when the light in the ultraviolet spectral range is emitted from the second light source 10, while the light in the visible spectral range used to display the pattern or character in color can be emitted from the top surface of the light guide plate 8.

Furthermore, the display apparatus 3 of the timepiece including such illumination device 6 can use the illumination device 6 to illuminate the bottom surface of the liquid crystal display panel 5 as a backlight. As a result, the first light source 9 of the illumination device 6 is turned on to emit the light in the visible spectral range while information is displayed on the liquid crystal display panel 5 so that the light in the visible spectral range being emitted can be radiated from the top surface of the light guide plate 8 to the bottom surface of the liquid crystal display panel 5 with the roughly uniform luminance. One can thus visually recognize the information displayed on the liquid crystal display panel 5 well with a sharp contrast.

When the second light source 10 of the illumination device 6 is turned on to emit light in the ultraviolet spectral range while information is displayed on the liquid crystal display panel 5, the display apparatus 3 of the timepiece is configured to guide the emitted light in the ultraviolet spectral range by the light guide plate 8 to be radiated on the transparent fluorescent layer 14 and converted into the light in the visible spectral range. In this case, the light in the visible spectral range being converted is radiated on a part of the bottom surface of the liquid crystal display panel 5. This allows a part of the information to be displayed in an enhanced manner on the liquid crystal display panel 5 and, at the same time, the pattern or character can be displayed in color as the background of the information displayed on the liquid crystal display panel 5. A visual effect can be improved as a result.

Note that what is described in the first embodiment is a case where the light in the ultraviolet spectral range emitted from the top surface of the light guide plate 8 is directly radiated onto the liquid crystal display panel 5 when the light in the ultraviolet spectral range emitted from the second light source 10 is guided by the light guide plate 8. However, there may be provided on the top surface of the light guide plate 8 a transparent ultraviolet light shielding sheet which only reflects and shields light in the ultraviolet spectral range, for example.

Such configuration allows the light in the ultraviolet spectral range emitted from the top surface of the light guide plate 8 to be reflected by the ultraviolet light shielding sheet and taken into the light guide plate 8 once again. No leakage of light in the ultraviolet spectral range occurs as a result. The liquid crystal material of the liquid crystal display panel 5 is not irradiated with the light in the ultraviolet spectral range, either. Therefore, the light can be effectively radiated onto the transparent fluorescent layer 14 while at the same time the deterioration of the liquid crystal material in the liquid crystal display panel 5 due to an ultraviolet ray can be prevented.

Second Embodiment

The second embodiment in which the present invention is applied to a timepiece will now be described with reference to FIGS. 3 to 6. Note that a part identical to that in the first embodiment illustrated in FIGS. 1 and 2 will be assigned the identical reference numeral.

As illustrated in FIGS. 3 to 6, the timepiece has roughly the same configuration as that in the first embodiment other than a light guide plate 20 of an illumination device 6 that is configured differently from the one in the first embodiment.

Figure 3:
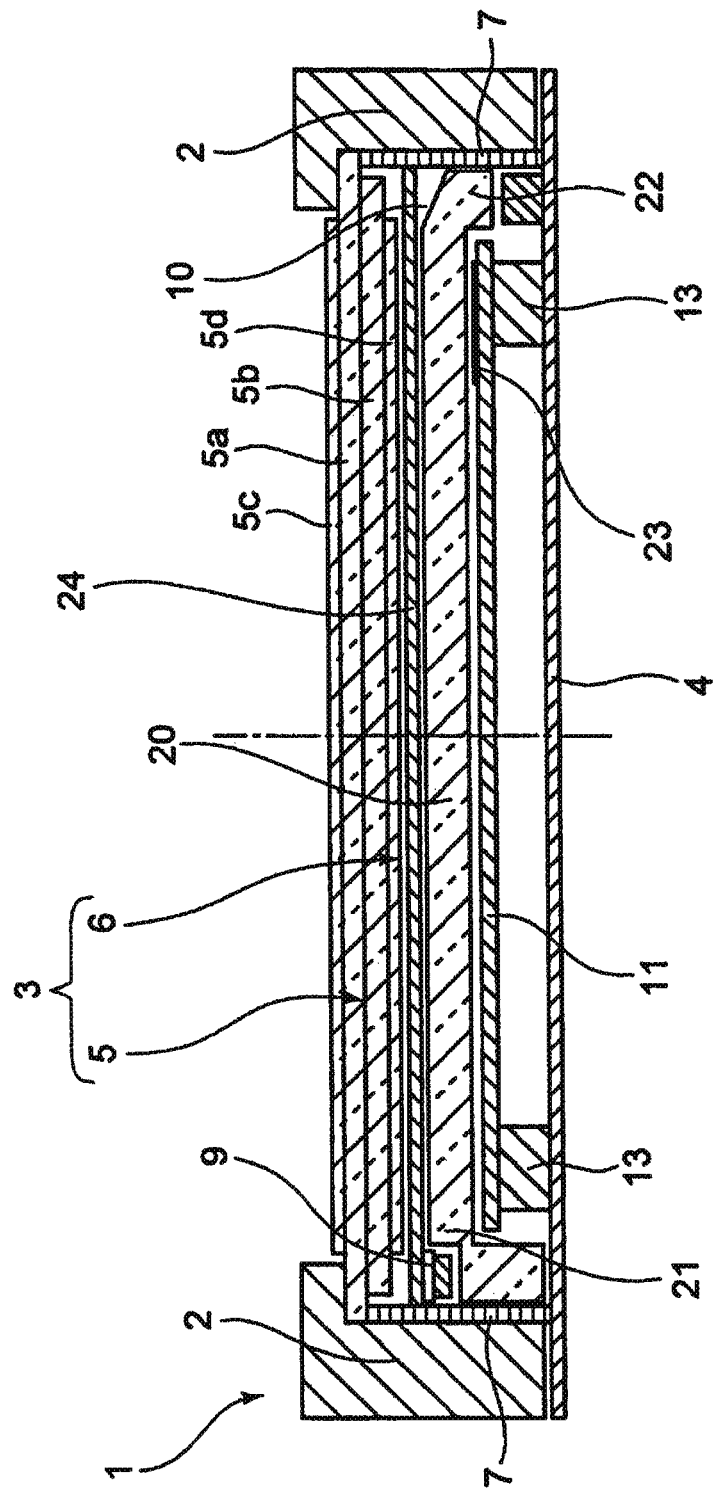
FIG. 3 is an enlarged cross-sectional view illustrating a principal part of a movement according to second embodiment in which the present invention is applied to a timepiece.
Figure 4A:
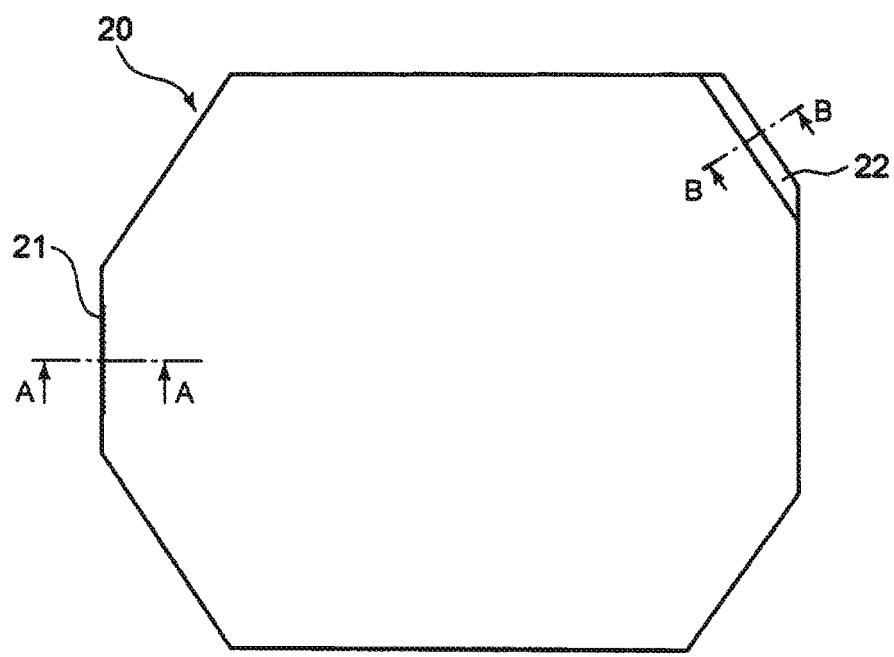
FIGS. 4A and 4B are diagrams each illustrating a light guide plate of an illumination device that is included in the movement illustrated in FIG. 3, where
Figure 4B:
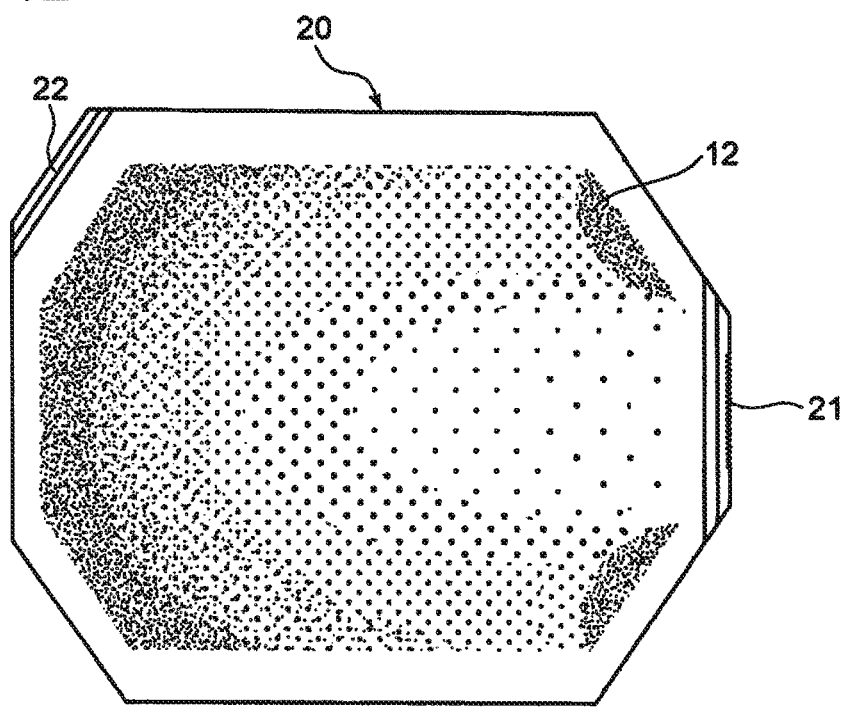

That is, the light guide plate 20 is roughly formed into a square flat shape as illustrated in FIGS. 3, 4A, and 4B. As with the first embodiment, the light guide plate 20 forms a light diffusion pattern 12 of diffusing incident light such that the density of the pattern is coarse on one side (a side corresponding to a first incident unit 21 on a right side part in FIG. 4B) and gets denser toward the other side (a left side part in FIG. 4B). The light guide plate is further configured to emit the incident light from a top surface of the plate.

In this case, the first incident unit 21 is provided at a middle part on one side (a left side part in FIG. 4A) of the light guide plate 20 to take in light from a first light source 9 to the light guide plate 20 along a surface direction thereof, as illustrated in FIGS. 4A and 4B. Moreover, a second incident unit 22 is provided at a corner of the upper side on the other side (a right side part in FIG. 4A) of the light guide plate 20 to take in light from a second light source 10 to the light guide plate 20 upward in a direction orthogonal to a surface direction of the plate.

Figure 5:
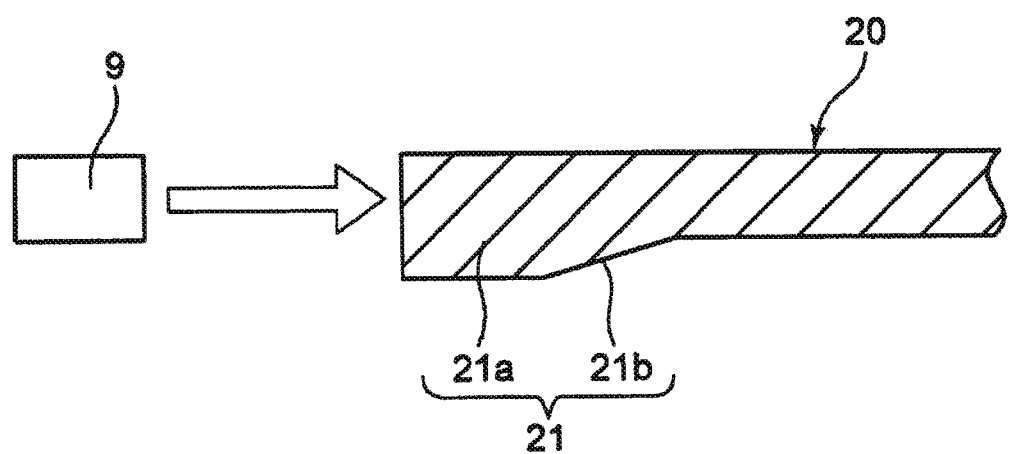
FIG. 5 is an enlarged cross-sectional view of a principal part of the light guide plate illustrated in FIG. 4A when viewed in the direction of arrow A-A.

That is, as illustrated in FIGS. 4A and 5, the first incident unit 21 is formed such that the middle part on the one side (the left side part in FIG. 4A) of the light guide plate 20 is projected laterally. The first incident unit 21 as illustrated in FIG. 5 includes a thick portion 21a corresponding to the projected portion having the thickness on the underside, and a tilt face 21b that is tilted from the thick portion 21a toward a bottom surface of the light guide plate 20. The first incident unit 21 is thus configured to take in the light emitted from the first light source 9 to the light guide plate 20 along the surface direction thereof.

Figure 6:
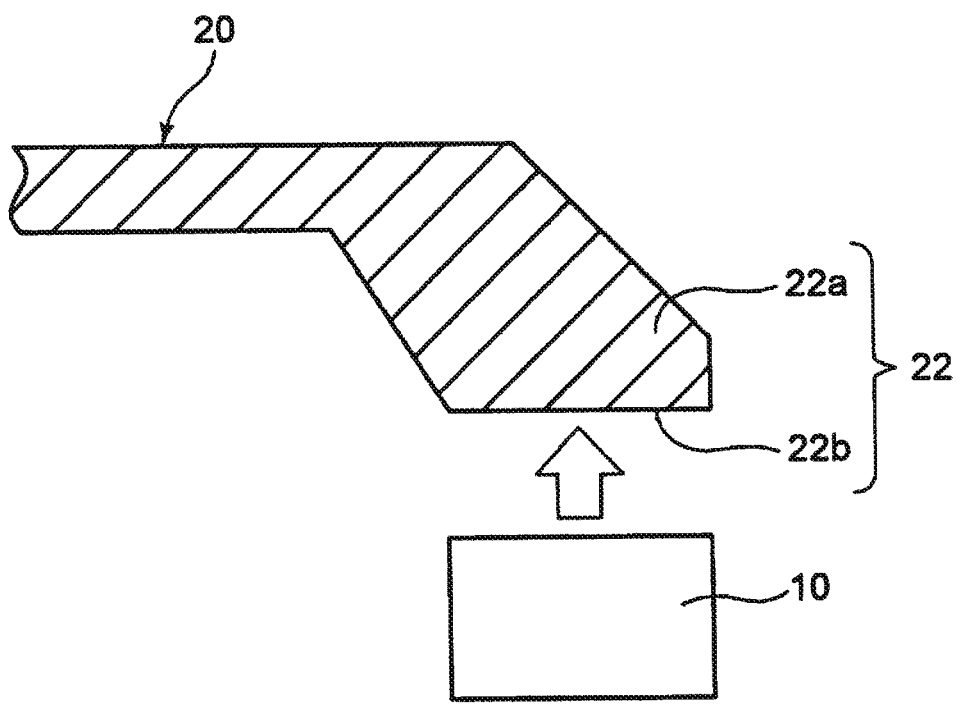
FIG. 6 is an enlarged cross-sectional view of a principal part of the light guide plate illustrated in FIG. 4A when viewed in the direction of arrow B-B.

Moreover, as illustrated in FIGS. 4A and 6, the second incident unit 22 is formed at the corner of the upper side on the other side (the right side part in FIG. 4A) of the light guide plate 20 to be projected downward. That is, the second incident unit 22 as illustrated in FIG. 6 includes a tilt portion 22a formed by extending the corner of the light guide plate 20 downward at approximately a 45 degree angle, and a flat incident surface 22b provided at a lower end of the tilt portion 22a. In this case, the tilt portion 22a is formed to have the thickness that gradually gets thicker from an upper part side toward a lower part side. It is desired that the tilt face of the top surface of the light guide plate 20 have a tilt angle of 45 degrees.

Accordingly, light in an ultraviolet spectral range emitted from the second light source 10 is taken in from the flat incident surface 22b located at the lower end to the tilt portion 22a of the second incident unit 22, as illustrated in FIG. 6. Most of the light in the ultraviolet spectral range being taken in, except a portion thereof, is reflected by a tilted inner surface of the tilt portion 22a. The reflected light is then taken into the light guide plate 20.

Now, as illustrated in FIG. 3, the illumination device 6 includes a transparent fluorescent layer 23 which is provided at a part of a top surface of a reflection plate 11 disposed under the light guide plate 20. As with the first embodiment, the transparent fluorescent layer 23 is configured to emit light in a visible spectral range when an electron is excited by the irradiation with light in the ultraviolet spectral range. The transparent fluorescent layer is provided at a part of the reflection plate 11 corresponding to the vicinity around the second incident unit 22.

Similar to the first embodiment, the transparent fluorescent layer 23 in this case is a multicolor printed layer emitting light of a plurality of different wavelengths within the visible spectral range when the electron is excited by the irradiation with light in the ultraviolet spectral range. That is, the transparent fluorescent layer 23 is printed with a plurality of fluorescent inks each emitting a visible ray corresponding to a different color (such as light of a different wavelength corresponding to each of red, blue, and yellow) when the electron is excited by the irradiation with light in the ultraviolet spectral range.

The transparent fluorescent layer 23 is thus configured to emit light in the visible spectral range when the electron is excited by the irradiation with light in the ultraviolet spectral range and display a pattern or character in color, as with the first embodiment. Moreover, as illustrated in FIG. 3, the illumination device 6 includes a transparent ultraviolet light shielding sheet 24 that is provided on the top surface side of the light guide plate 20 to only reflect and shield light in the ultraviolet spectral range.

The working of a display apparatus 3 in the timepiece will now be described.

Similar to the first embodiment, the first light source 9 of the illumination device 6 is turned on first to radiate light in the visible spectral range when information is to be displayed on the display apparatus 3. The radiated light in the visible spectral range is taken into the light guide plate 20 from the first incident unit 21 of the light guide plate 20. The light in the visible spectral range being taken in is then roughly evenly diffused by the light diffusion pattern 12 of the light guide plate 20 and emitted from the top surface of the light guide plate 20 with roughly uniform luminance.

The light in the visible spectral range being emitted is transmitted through the transparent ultraviolet light shielding sheet 24 and radiated on the bottom surface of the liquid crystal display panel 5 with roughly uniform luminance. Therefore, as with the first embodiment, black-color information displayed by a pixel in a light-shielding state on the liquid crystal display panel 5 is displayed well with a sharp contrast.

Moreover, the light in the ultraviolet spectral range emitted from the second light source 10 by turning on the second light source 10 of the illumination device 6 in such state is taken into the light guide plate 20 from the second incident unit 22 provided on the other side of the light guide plate 20. Similar to the first embodiment, the light in the ultraviolet spectral range being taken in travels while diffused from the dense side toward the coarse side of the light diffusion pattern 12, but does not reach the edge on the side where the density of the light diffusion pattern 12 is coarse.

At this time, the light in the ultraviolet spectral range emitted from the second light source 10 is taken into the tilt portion 22a from the flat incident surface 22b located at the lower end of the second incident unit 22. Most of the light in the ultraviolet spectral range being taken in, except a portion thereof, is then reflected by the tilted inner surface of the tilt portion 22a. The reflected light is thereafter taken into the light guide plate 20.

A portion of the light in the ultraviolet spectral range taken into the light guide plate 20 is emitted from the bottom surface of the light guide plate 20, so that the emitted light is radiated onto the transparent fluorescent layer 23 provided on the reflection plate 11. The transparent fluorescent layer 23 thereafter reacts to the light irradiation and emits light in the visible spectral range. Similar to the first embodiment, a pattern or character can be displayed in color in this case as the fluorescent layer 23 is the multicolor printed layer emitting the visible ray corresponding to different colors (such as light of a wavelength corresponding to each of red, blue, and yellow).

Another portion of the light in the ultraviolet spectral range being taken into the light guide plate 20 is emitted from the top surface of the light guide plate 20, reflected by the transparent ultraviolet light shielding sheet 24, and then taken into the light guide plate 20 once again. A portion of the light being taken in is emitted from the bottom surface of the light guide plate 20 so that the emitted light is radiated to the transparent fluorescent layer 23 that is provided on the reflection plate 11. The transparent fluorescent layer 23 thereafter reacts to the irradiation with the light in the ultraviolet spectral range to emit light in the visible spectral range.

A portion of the light in the visible spectral range emitted from the transparent fluorescent layer 23 for color display is directly made incident on the light guide plate 20, while another portion of the light is reflected by the top surface of the reflection plate 11 and made incident on the light guide plate 20. The light in the visible spectral range made incident on the light guide plate 20 is then emitted from the top surface of the light guide plate 20, transmitted through the transparent ultraviolet light shielding sheet 24, and radiated on the bottom surface of the liquid crystal display panel 5.

At this time, the transparent fluorescent layer 23 is provided on the reflection plate 11 in the vicinity around the second incident unit 22 corresponding to a side the second light source 10 is located. Therefore, the light in the visible spectral range emitted from the transparent fluorescent layer 23 is locally radiated on a part of the liquid crystal display panel 5 corresponding to the vicinity around the incident unit located on the side of the second light source 10, when the pattern or character is displayed in color.

Accordingly, the light locally radiated on the part of the liquid crystal display panel 5 corresponding to the vicinity around the second incident unit 22 located on the side of the second light source 10 has higher luminance than that of the light radiated to another region of the liquid crystal display panel 5.

As a result, the black-color information displayed in the part of the liquid crystal display panel 5 corresponding to the vicinity around the second incident unit 22 located on the side of the second light source 10 has enhanced brightness compared with black-color information displayed in the other region of the liquid crystal display panel 5. At the same time, the pattern or character is displayed in color as a background of the black-color information displayed on the liquid crystal display panel 5.

When the light is radiated by turning on only the second light source 10 without turning on the first light source 9, the light in the visible spectral range is radiated only onto the part of the liquid crystal display panel 5 corresponding to the vicinity around the second incident unit 22 located on the side of the second light source 10 and not radiated to the rest of the region of the liquid crystal display panel 5. As a result, among the black-color information displayed by the pixel in the light-shielding state on the liquid crystal display panel 5, only the one displayed in the part of the liquid crystal display panel 5 corresponding to the vicinity around the second incident unit 22 is displayed in the locally enhanced manner.

Similar to the first embodiment, the light emitted from the first light source 9 upon turning on the first light source 9 can be guided while being roughly evenly diffused across the light guide plate 20 by the light diffusion pattern 12 of the light guide plate 20, according to the illumination device 6 of the display apparatus 3 in the timepiece. The illumination device can further emit the guided light from the top surface of the light guide plate 20 with the roughly uniform luminance. When the light is emitted by turning on the second light source 10, the illumination device can locally enhance the brightness as well by locally increasing the luminance of the light emitted from the top surface of the light guide plate 20 by the dense part of the light diffusion pattern 12 in the light guide plate 20. As a result, the emission of light can be expressed in a different manner by selectively emitting light from each of the first and second light sources 9 and 10.

In this case, the transparent fluorescent layer 23 on the reflection plate 11 that is disposed on the bottom surface side of the light guide plate 20 is provided only in the vicinity around the second incident unit 22. When irradiated with the light in the ultraviolet spectral range emitted from the second light source 10, the transparent fluorescent layer 23 emits light in the visible spectral range to display the pattern or character in color. The light in the visible spectral range used for color display can thus be radiated locally to the site of the liquid crystal display panel 5 corresponding to the vicinity around the second incident unit 22. Accordingly, the information displayed on the liquid crystal display panel 5 can be locally enhanced as compared with the case described in the first embodiment. At the same time, the pattern or character can be displayed in color as the background of the information displayed on the liquid crystal display panel 5.

In this case as well, the transparent ultraviolet light shielding sheet 24 that only reflects and shields light in the ultraviolet spectral range is provided on the top surface of the light guide plate 20 to be able to reflect the light in the ultraviolet spectral range emitted from the top surface of the light guide plate 20 by the ultraviolet light shielding sheet 24 and take in the light to the light guide plate 20 once again, as with the variation of the first embodiment. Therefore, the light in the ultraviolet spectral range can be effectively radiated to the transparent fluorescent layer 23 without any leakage. Not irradiated with the light in the ultraviolet spectral range, the liquid crystal material of the liquid crystal display panel 5 does not deteriorate by the ultraviolet ray.

In this case, the first incident unit 21 is provided on the one side of the light guide plate 20 to take in light from the first light source 9 inside the light guide plate 20 along the surface direction thereof. The second incident unit 22 is provided on the other side of the light guide plate 20 to take in light emitted from the second light source 10 to the light guide plate 20 upward in a direction orthogonal to the surface direction of the light guide plate 20. The second light source 10 can be disposed below the light guide plate 20 as a result.

Accordingly, in the illumination device 6, the area of the top surface of the light guide plate 20, namely the area of the light guide plate 20 from which light is emitted, can be increased while at the same time decreasing the area in which the whole illumination device 6 is installed. This allows a display area of the liquid crystal display panel 5 to be increased while at the same time downsizing the display apparatus 3 and a movement 1. The whole timepiece can be downsized as a result.

Third Embodiment

The third embodiment in which the present invention is applied to a timepiece will now be described with reference to FIG. 7. In this case as well, a part identical to that in the first embodiment illustrated in FIGS. 1 and 2 will be assigned the identical reference numeral.

Figure 7:
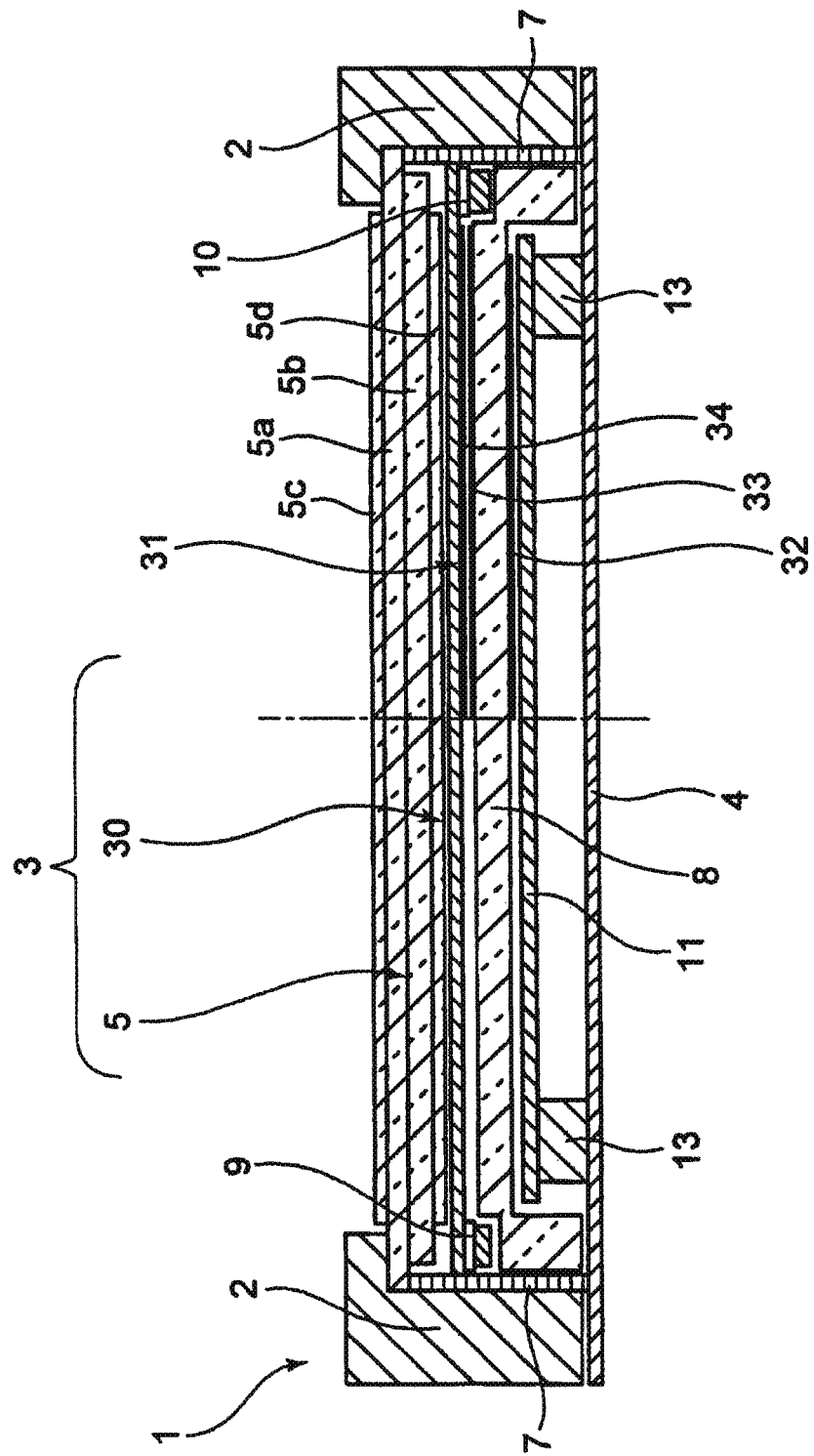
FIG. 7 is an enlarged cross-sectional view illustrating a principal part of a movement according to third embodiment in which the present invention is applied to a timepiece.

As illustrated in FIG. 7, the timepiece has roughly the same configuration as that in the first embodiment other than an illumination device 30 that is configured differently from the one in the first embodiment.

That is, the illumination device 30 as illustrated in FIG. 7 is provided on a side corresponding to a top surface of a light guide plate 8, and includes a transparent ultraviolet light shielding sheet 31 which only reflects and shields light in an ultraviolet spectral range. The illumination device 30 further includes a transparent first fluorescent layer 32 provided on a bottom surface of the light guide plate 8, a transparent second fluorescent layer 33 provided on the top surface of the light guide plate 8, and a transparent third fluorescent layer 34 provided on a bottom surface of the ultraviolet light shielding sheet 31.

In this case, the first fluorescent layer 32 is provided in a region covering roughly a right half of the bottom surface of the light guide plate 8 corresponding to the side a second light source 10 is located, as illustrated in FIG. 7. In other words, the first fluorescent layer 32 is provided in a region covering roughly half the light guide plate 8 located on the side where the density of a light diffusion pattern 12 is dense. The second fluorescent layer 33 is provided in a region covering roughly a right half of the top surface of the light guide plate 8 to correspond to the first fluorescent layer 32. The third fluorescent layer 34 is provided in a region covering roughly a right half of the bottom surface of the ultraviolet light shielding sheet 31 to correspond to the first fluorescent layer 32.

Similar to the first embodiment, each of the transparent first to third fluorescent layers 32 to 34 is a multicolor printed layer emitting light of a plurality of different wavelengths within the visible spectral range when an electron is excited by the irradiation with light in the ultraviolet spectral range. That is, each of the transparent first to third fluorescent layers 32 to 34 is printed with a plurality of fluorescent inks each emitting a visible ray corresponding to a different color (such as light of a different wavelength corresponding to each of red, blue, and yellow) when the electron is excited by the irradiation with light in the ultraviolet spectral range. Each of the transparent first to third fluorescent layers 32 to 34 is thus configured to individually display a pattern or character in color.

The working of a display apparatus 3 in the timepiece will now be described.

When a first light source 9 of the illumination device 30 is turned on to emit light in the visible spectral range in displaying information on the display apparatus 3, the light in the visible spectral range is emitted with roughly uniform luminance from the top surface of the light guide plate 8 to be radiated on the bottom surface of a liquid crystal display panel 5 with roughly uniform luminance, as described in the first embodiment. The information is therefore displayed well with a sharp contrast on the liquid crystal display panel 5.

When light in the ultraviolet spectral range is emitted by turning on a second light source 10 of the illumination device 30, on the other hand, the light in the ultraviolet spectral range being emitted is taken into the light guide plate 8 from a second incident unit 8b of the light guide plate 8 as illustrated in FIG. 2. The light in the ultraviolet spectral range being taken in travels while diffused from a dense side toward a coarse side of a light diffusion pattern 12, but does not reach an edge on the side where the density of the light diffusion pattern 12 is coarse.

A portion of the light in the ultraviolet spectral range taken into the light guide plate 8 is emitted from the bottom surface of the light guide plate 8, so that the emitted light is radiated to the transparent first fluorescent layer 32 provided on the bottom surface of the light guide plate 8. The first fluorescent layer 32 thereafter reacts to the light in the ultraviolet spectral range being radiated and emits light in the visible spectral range to display a pattern or character in color.

A portion of the light in the visible spectral range emitted from the first fluorescent layer 32 to display the pattern or character in color is taken into the light guide plate 8, while another portion of such light is reflected by a reflection plate 11 and taken into the light guide plate 8 once again. The light in the visible spectral range taken into the light guide plate 8 is then emitted from the top surface of the light guide plate 8, transmitted through the ultraviolet light shielding sheet 31, and radiated onto the bottom surface of the liquid crystal display panel 5.

Another portion of the light in the ultraviolet spectral range that is taken into the light guide plate 8 is emitted from the top surface of the light guide plate 8. A portion of the emitted light is then radiated to the second fluorescent layer 33 provided on the top surface of the light guide plate 8. A portion of the light not absorbed in the second fluorescent layer 33 and leaking passes through the second fluorescent layer 33. At this time, the light in the ultraviolet spectral range radiated to the second fluorescent layer 33 is converted into the light in the visible spectral range by the second fluorescent layer 33 in order to display the pattern or character in color. The light in the visible spectral range used for color display is transmitted through the ultraviolet light shielding sheet 31 to be emitted upward.

Furthermore, the light in the ultraviolet spectral range passing through the second fluorescent layer 33 is converted to the light in the visible spectral range by the third fluorescent layer 34 provided on the bottom surface of the ultraviolet light shielding sheet 31 in order to display the pattern or character in color. The light in the visible spectral range used for color display is then transmitted through the ultraviolet light shielding sheet 31 to be emitted upward. As a result, all the light in the visible spectral range that is converted from the light in the ultraviolet spectral range by each of the first to third fluorescent layers 32 to 34 to display the pattern or character in color is transmitted through the ultraviolet light shielding sheet 31 and radiated to the bottom surface of the liquid crystal display panel 5.

At this time, each of the first to third fluorescent layers 32 to 34 is provided in a region covering roughly a right half of the bottom surface of the light guide plate 8 corresponding to the side the second light source 10 is located, namely, a region covering roughly half the light guide plate 8 corresponding to the side where the density of the light diffusion pattern 12 is dense. Therefore, the light in the visible spectral range emitted by each of the first to third fluorescent layers 32 to 34 when an electron is excited by the irradiation with light in the ultraviolet spectral range is radiated in a region covering roughly half the liquid crystal display panel 5 located on the side of the second light source 10.

Accordingly, the light in the visible spectral range that is radiated onto the liquid crystal display panel 5 for color display has higher luminance when radiated in the region covering roughly half the liquid crystal display panel 5 on the side of the second light source 10 than when radiated in another region of the liquid crystal display panel 5. As a result, black-color information displayed in the region covering roughly half the liquid crystal display panel 5 on the side of the second light source 10 has enhanced brightness compared with black-color information displayed in the other region of the liquid crystal display panel 5. At the same time, the pattern or character is displayed in color as a background of the black-color information displayed on the liquid crystal display panel 5.

In this case, each of the first to third fluorescent layers 32 to 34 is installed at a different vertical position. The light in the visible spectral range emitted from each of the first to third fluorescent layers 32 to 34 for color display is radiated to the bottom surface of the liquid crystal display panel 5 and transmitted therethrough. Therefore, the pattern or character displayed in color by the light emitted from the different vertical positions appears to have depth in the vertical direction and be three dimensional when viewed from above the liquid crystal display panel 5.

The display apparatus 3 of the timepiece as described above has the effect similar to that of the first embodiment, and can reliably convert the light in the ultraviolet spectral range emitted from the second light source 10 of the illumination device 30 into the light in the visible spectral range by each of the first to third fluorescent layers 32 to 34 to be able to brightly illuminate the liquid crystal display panel 5 with sufficient amount of light. Moreover, each of the first to third fluorescent layers 32 to 34 is installed at the different vertical position so that each pattern or character displayed in color by the light emitted from the different vertical positions can have depth in the vertical direction and be perceived as being three dimensional.

Note that while the third embodiment uses the light guide plate 8 identical to that in the first embodiment, the third embodiment may also be configured to use the light guide plate 20 identical to that in the second embodiment. That is, the light guide plate 20 is configured to include a first incident unit 21 provided on one side of the light guide plate to take in light from the first light source 9 to the light guide plate 20 along the surface direction thereof, and a second incident unit 22 provided on the other side of the light guide plate to take in light emitted from the second light source 10 to the light guide plate 20 from a direction orthogonal to the surface direction thereof.

Furthermore, each of the fluorescent layers 14, 23, and first to third fluorescent layers 32 to 34 in each of the aforementioned first to third embodiments and the variations thereof is printed with the plurality of fluorescent inks each emitting the visible ray corresponding to a different color (such as the light of the wavelength corresponding to each of red, blue, and yellow) when the electron is excited by the irradiation with the light in the ultraviolet spectral range. However, each fluorescent layer may also be printed with a fluorescent ink of a single color emitting a visible ray of a specific wavelength when the electron is excited by the irradiation with the light in the ultraviolet spectral range.

While the second light source 10 is configured to emit the light in the ultraviolet spectral range in each of the aforementioned first to third embodiments and the variations thereof, the second light source is not necessarily required to emit the light in the ultraviolet spectral range but may be configured to emit light of a specific wavelength in the visible spectral range (such as light of a specific wavelength corresponding to one of red, blue, and yellow), for example.

Moreover, in each of the aforementioned first to third embodiments and the variations thereof, each of the fluorescent layers 14, 23, and first to third fluorescent layers 32 to 34 is provided to correspond to a part of the top and bottom surfaces of the light guide plates 8 and 20. The fluorescent layer may however be provided to correspond to the entire top and bottom surfaces of the light guide plates 8 and 20 as well.

While the reflection plate 11 is provided on the bottom surface side of the light guide plates 8 and 20 in each of the aforementioned first to third embodiments and the variations thereof, a reflection layer may be provided directly on the bottom surface of the light guide plates 8 and 20 as well.

While each of the aforementioned first to third embodiments and the variations thereof is applied to the timepiece, each embodiment and variation can also be applied to a variety of es timepieces such as a travel timepiece, an alarm clock, a table clock, and a wall clock. Moreover, each embodiment and variation can be widely applied to a variety of electronics such as a mobile phone and a personal digital assistant in addition to the timepiece.

While some embodiments of the present invention have been described, the present invention is not to be limited to what is described herein but includes the invention described in claims and its equivalents.

What is claimed is:
1. An illumination device comprising:
   a light guide plate in which a light diffusion pattern of diffusing incident light is formed to have density that is coarse on one side and gets denser toward the other side;
   a first light source configured to be provided on a side corresponding to the one side of the light diffusion pattern in the light guide plate;
   a second light source configured to be provided on a side corresponding to the other side of the light diffusion pattern in the light guide plate; and
   a fluorescent layer configured to be provided to correspond to the side where the density of the light diffusion pattern in the light guide plate is dense, the fluorescent layer emitting light in a visible spectral range of a wavelength longer than that of light from the second light source once an electron is excited by irradiation with the light from the second light source.
2. The illumination device according to claim 1, further comprising:
   a first incident unit configured to be provided on the one side of the light guide plate and take in light from the first light source to the light guide plate along a surface direction of the plate; and
   a second incident unit configured to be provided on the other side of the light guide plate and take in light from the second light source to the light guide plate along a surface direction of the plate.
3. The illumination device according to claim 1, further comprising:
   a first incident unit configured to be provided on the one side of the light guide plate and take in light from the first light source to the light guide plate along a surface direction of the plate; and
   a second incident unit configured to be provided on the other side of the light guide plate and take in light emitted from the second light source to the light guide plate from a direction orthogonal to a surface direction of the plate.
4. The illumination device according to claim 1, further comprising:
   a first incident unit configured to be provided on the one side of the light guide plate and take in light from the first light source to the light guide plate along a surface direction of the plate;
   a second incident unit configured to be provided on the other side of the light guide plate and take in light from the second light source to the light guide plate along a surface direction of the plate; and
   a fluorescent layer configured to be provided to correspond to at least a part of a surface of the light guide plate from which the incident light is emitted, the fluorescent layer emitting light in a visible spectral range of a wavelength longer than that of light from the second light source once an electron is excited by irradiation with the light from the second light source.
5. The illumination device according to claim 1, further comprising:
   a first incident unit configured to be provided on the one side of the light guide plate and take in light from the first light source to the light guide plate along a surface direction of the plate;
   a second incident unit configured to be provided on the other side of the light guide plate and take in light emitted from the second light source to the light guide plate from a direction orthogonal to a surface direction of the plate; and
   a fluorescent layer configured to be provided to correspond to at least a part of a surface of the light guide plate from which the incident light is emitted, the fluorescent layer emitting light in a visible spectral range of a wavelength longer than that of light from the second light source once an electron is excited by irradiation with the light from the second light source.
6. The illumination device according to claim 1, wherein the first light source is configured to emit light in a visible spectral range, while the second light source is configured to emit light in an ultraviolet spectral range.
7. The illumination device according to claim 1, further comprising:
   a first incident unit configured to be provided on the one side of the light guide plate and take in light from the first light source to the light guide plate along a surface direction of the plate; and
   a second incident unit configured to be provided on the other side of the light guide plate and take in light from the second light source to the light guide plate along a surface direction of the plate, wherein
   the first light source is configured to emit light in a visible spectral range, while the second light source is configured to emit light in an ultraviolet spectral range.
8. The illumination device according to claim 1, further comprising:

a first incident unit configured to be provided on the one side of the light guide plate and take in light from the first light source to the light guide plate along a surface direction of the plate; and a second incident unit configured to be provided on the other side of the light guide plate and take in light emitted from the second light source to the light guide plate from a direction orthogonal to a surface direction of the plate, wherein the first light source is configured to emit light in a visible spectral range, while the second light source is configured to emit light in an ultraviolet spectral range.

9. The illumination device according to claim 1, further comprising a fluorescent layer configured to be provided to correspond to at least a part of a surface of the light guide plate from which the incident light is emitted, the fluorescent layer emitting light in a visible spectral range of a wavelength longer than that of light from the second light source once an electron is excited by irradiation with the light from the second light source, wherein the first light source is configured to emit light in a visible spectral range, while the second light source is configured to emit light in an ultraviolet spectral range.

10. The illumination device according to claim 1, further comprising a fluorescent layer configured to be provided to correspond to at least a part of a surface of the light guide plate from which the incident light is emitted, the fluorescent layer emitting light in a visible spectral range of a wavelength longer than that of light from the second light source once an electron is excited by irradiation with the light from the second light source, wherein the fluorescent layer is provided to correspond to the other side of a surface of the light guide plate.

11. The illumination device according to claim 1, further comprising:

a fluorescent layer configured to be provided to correspond to at least a part of a surface of the light guide plate from which the incident light is emitted, the fluorescent layer emitting light in a visible spectral range of a wavelength longer than that of light from the second light source once an electron is excited by irradiation with the light from the second light source; and a reflection plate configured to be provided with the fluorescent layer, wherein the fluorescent layer is provided in a region covering roughly half the reflection plate which is located on a side corresponding to the other side of a surface of the light guide plate.

12. The illumination device according to claim 1, further comprising:

a fluorescent layer configured to be provided to correspond to at least a part of a surface of the light guide plate from which the incident light is emitted, the fluorescent layer emitting light in a visible spectral range of a wavelength longer than that of light from the second light source once an electron is excited by irradiation with the light from the second light source; and a reflection plate configured to be provided with the fluorescent layer, wherein the fluorescent layer is provided at a part of the reflection plate corresponding to the vicinity around a second incident unit which is formed in a corner on the other side of a surface of the light guide plate.

13. The illumination device according to claim 1, further comprising a fluorescent layer configured to be provided to correspond to at least a part of a surface of the light guide plate from which the incident light is emitted, the fluorescent layer emitting light in a visible spectral range of a wavelength longer than that of light from the second light source once an electron is excited by irradiation with the light from the second light source, wherein the fluorescent layer is a printed layer, an electron in which is excited when irradiated with light in an ultraviolet spectral range.

14. The illumination device according to claim 1, wherein the first light source is configured to emit light in a visible spectral range, while the second light source is configured to emit light in an ultraviolet spectral range, and a fluorescent layer is a printed layer, an electron in which is excited when irradiated with light in an ultraviolet spectral range.

15. The illumination device according to claim 1, further comprising a fluorescent layer configured to be provided to correspond to at least a part of a surface of the light guide plate from which the incident light is emitted, the fluorescent layer emitting light in a visible spectral range of a wavelength longer than that of light from the second light source once an electron is excited by irradiation with the light from the second light source, wherein the fluorescent layer is provided to correspond to the other side of a surface of the light guide plate and is a printed layer, an electron in which is excited when irradiated with light in an ultraviolet spectral range.

16. The illumination device according to claim 1, further comprising an ultraviolet light shielding unit configured to shield light in an ultraviolet spectral range while provided on a side of the surface of the light guide plate from which light made incident to the light guide plate is emitted.

17. The illumination device according to claim 1, further comprising:

a first incident unit configured to be provided on the one side of the light guide plate and take in light from the first light source to the light guide plate along a surface direction of the plate;

a second incident unit configured to be provided on the other side of the light guide plate and take in light from the second light source to the light guide plate along a surface direction of the plate; and an ultraviolet light shielding unit configured to shield light in an ultraviolet spectral range while provided on a side of the surface of the light guide plate from which light made incident to the light guide plate is emitted.

18. A display apparatus comprising:

the illumination device according to claim 1; and a liquid crystal display panel configured to be illuminated by the illumination device.

19. A timepiece comprising the illumination device according to claim 1.

* * * * *